United States Patent [19]

Limbocker

[11] 4,373,939
[45] Feb. 15, 1983

[54] AIR-FILTER VACUUM SWEEP APPARATUS

[76] Inventor: Craig F. Limbocker, P.O. Box 486, Sandy, Oreg. 97055

[21] Appl. No.: 285,151

[22] Filed: Jul. 20, 1981

[51] Int. Cl.³ .............................................. B01D 46/04
[52] U.S. Cl. ................................... 55/287; 15/415 R; 55/294; 55/303; 55/341 NT
[58] Field of Search ................. 55/294, 287, 284, 301, 55/341 NT, 303; 210/413; 15/415 R, 312 R

[56] References Cited

U.S. PATENT DOCUMENTS

| | | | |
|---|---|---|---|
| 586,742 | 7/1897 | Marmon | 55/287 |
| 2,369,649 | 2/1945 | Abrams | 55/294 X |
| 3,813,853 | 6/1974 | Anderson | 55/294 X |
| 3,951,627 | 4/1976 | Barr, Jr. et al. | 55/294 X |
| 4,233,041 | 11/1980 | Noland | 55/294 X |
| 4,279,057 | 7/1981 | Restivo | 15/415 R |
| 4,293,320 | 10/1981 | Robinson | 55/294 X |

FOREIGN PATENT DOCUMENTS

| | | | |
|---|---|---|---|
| 2425882 | 1/1980 | France | 55/294 |
| WO80/00312 | 3/1980 | PCT Int'l Appl. | 55/294 |
| 2056308 | 3/1981 | United Kingdom | 55/294 |

Primary Examiner—Kathleen J. Prunner
Attorney, Agent, or Firm—Kolisch, Hartwell & Dickinson

[57] ABSTRACT

Vacuum sweep apparatus in an air-filter system which includes a horizontally disposed plate having an array of openings, a plurality of filter bags mounted on the upper side of the plate and communicating with the openings, and a vacuum sweep arm mounted for rotation below the plate. The apparatus includes a base conduit mounted on the arm, in fluid communication therewith, a head conduit, and a flexible, fluid-tight skirt joining the base and head conduits in sealed fluid communication. The skirt accommodates limited multi-directional movement of the head conduit with respect to the base conduit. The head conduit is biased toward the plate so that, as the sweep arm is rotated, an apertured plate-contact member carried on the head conduit is pressed against the plate to seal the air-flow passages formed by successive registries between openings in the plate and an aperture in the plate-contact member.

7 Claims, 7 Drawing Figures

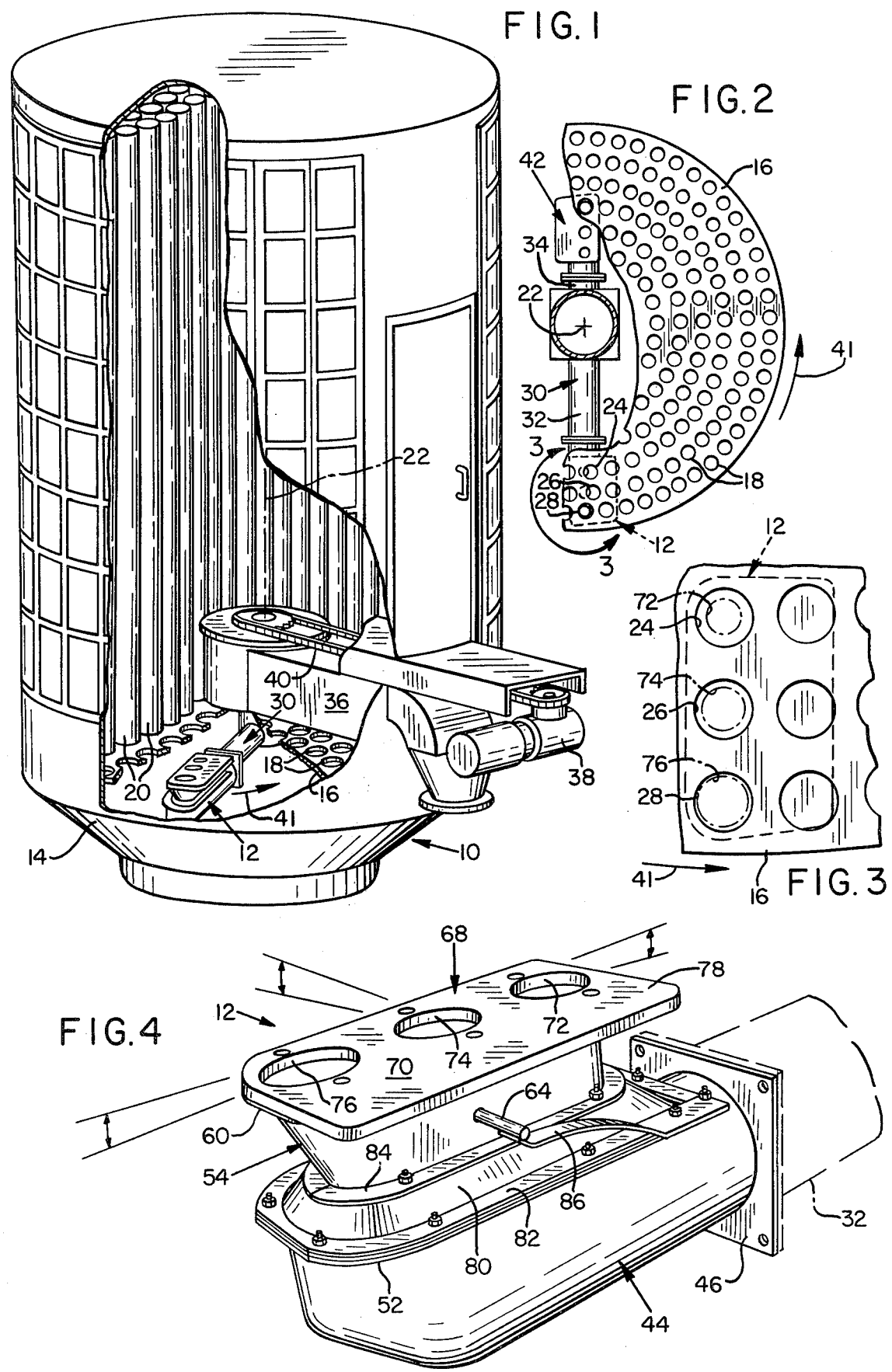

AIR-FILTER VACUUM SWEEP APPARATUS

BACKGROUND AND SUMMARY

The present invention relates to an improved vacuum sweep apparatus for use in an air-filter system of the type having a plurality of air-filter bags which are cleaned periodically by applying a vacuum to the bags.

One type of air-filter system known in the prior art employs a plurality of upright filter bags mounted on a support plate and communicating at their lower ends with openings in the plate. Unfiltered air introduced into the bags through the plate openings is filtered by its passage through the bags. The bags are cleaned periodically to remove accumulated filtrate by a vacuum sweep device having a rotating vacuum arm and a planar head member rigidly mounted on the arm for movement against the lower side of the plate. As the arm is rotated, apertures in the head member are brought into registry with successive openings in the plate, connecting the vacuum device with the air-filter bags associated with those openings.

During operation of the just-described sweep device, variations in the planarity of the support plate, and variations in the tilt of the rotational axis of the sweep arm cause the head member to move in and out of contact with the lower side of the plate as the vacuum arm rotates. At arm positions where the head member is out of contact with the plate, air passages formed between plate openings and in-register head apertures are substantially unsealed, reducing the vacuum applied to the associated filter bags. Filter bags which are inadequately cleaned for this reason function inefficiently in filtering.

An important object of the present invention is to provide, in a vacuum sweep device used in an air-filter system, a sweep apparatus having an articulated vacuum head which is movable multidirectionally to remain in sealed contact with one side of a bag-support plate in the system as the vacuum device is moved with respect to the plate.

Another object of the invention is to provide, in such apparatus, an apron portion which is adapted to cover a plate opening completely as the vacuum head is moved toward a position communicating that opening with an aperture in the vacuum head.

It is another object of the invention to provide in this apparatus, a plurality of radially spaced apertures which are dimensioned to produce, when in registry with associated radially spaced openings in a bag-support plate, substantially uniform air-flow rates.

Still another object of the present invention is to provide such sweep apparatus which is easily adapted for use in pre-existing air-filter systems.

The sweep apparatus of the present invention is constructed for use in an air-filter system which includes a plate having an array of openings, and a hollow sweep arm mounted on one side of the plate for rotational movement with respect thereto. The apparatus includes a base conduit mounted on the arm, in fluid communication therewith, a head conduit, and a flexible, fluid-tight skirt joining the base and head conduits in sealed fluid communication. The skirt accommodates limited multidirectional movement of the head conduit with respect to the base conduit. The head conduit is biased toward the plate so that as the arm is rotated, an apertured plate-contact member on the head is pressed against the plate to seal the air-flow passages formed by successive registries between openings in the plate and an aperture in the plate-contact member.

In a preferred embodiment of the invention, the plate-contact member includes an apron portion adapted to cover a plate opening completely as the head conduit is moved toward a position communicating that opening with an aperture in the contact member. Also in a preferred embodiment, the plate-contact member includes plural radially spaced apertures adapted for successive registries with associated radially spaced plate openings, where radially adjacent apertures are dimensioned to produce, when in registry with associated plate openings, substantially uniform air-flow rates.

These and other objects and features of the present invention will become more fully apparent when the following detailed description of a preferred embodiment of the invention is read in conjunction with the accompanying drawings, wherein:

DESCRIPTION OF THE DRAWINGS

FIG. 1 is a perspective, partially cutaway view of an air-filter system which includes vacuum sweep apparatus constructed according to the present invention;

FIG. 2 is a fragmentary plan view of a bag-support plate in the system shown in FIG. 1, and of a pair of vacuum sweep arms, each having a vacuum sweep apparatus mounted thereon;

FIG. 3 is an enlarged fragmentary plan view taken generally in the region partially bounded by curved line 3—3 in FIG. 2, showing in dash-dot lines apertures in a sweep apparatus depicted in positions of coaxial registry with three radially spaced openings in the plate;

FIG. 4 is an enlarged perspective view of the sweep apparatus seen in FIG. 1, with a fragmentary end portion of a vacuum sweep arm to which the apparatus is attached shown in dashed lines;

DETAILED DESCRIPTION OF A PREFERRED EMBODIMENT OF THE INVENTION

Figure 5:
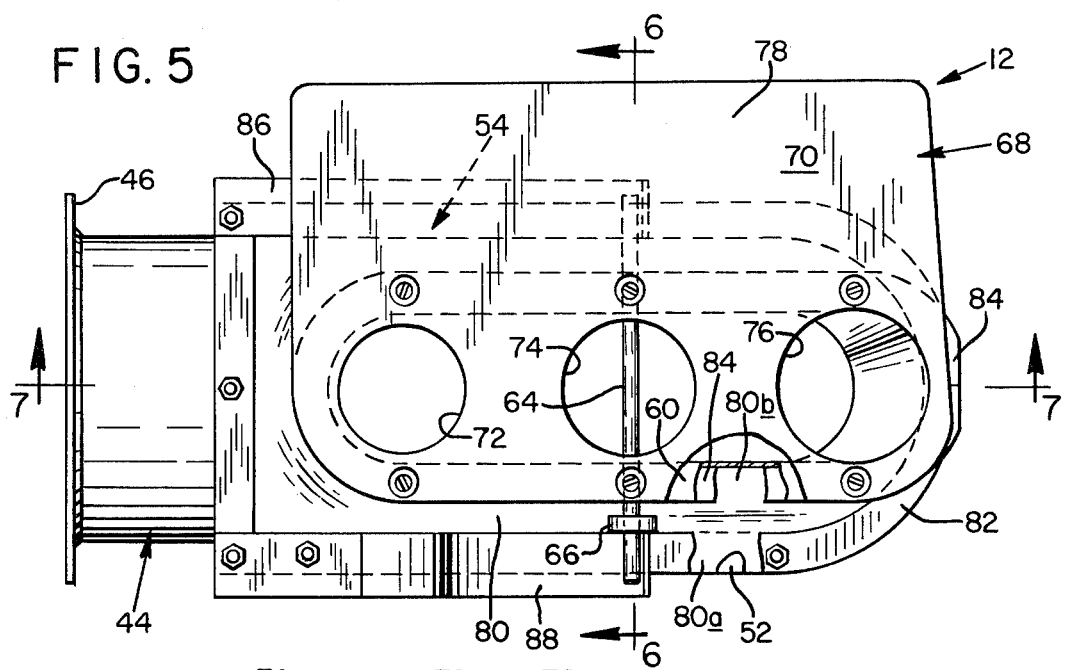
FIG. 5 is a slightly enlarged plan view of the apparatus shown in FIG. 4.

FIG. 1 shows an air-filter system 10 employing plural vacuum sweep apparatus, such as the one shown at 12, constructed according to the present invention. System 10 includes a housing 14 whose tapered, lower end in the figure defines a lower opening through which unfiltered air is introduced into the housing. A bag-support plate 16 in the system has an array of circular openings, such as openings 18, communicating regions in housing 14 on either side of the plate. A plurality of elongated, upright, air-filter bags, such as bags 20, one for each opening, are mounted on plate 16 and communicate at lower open ends with associated openings in the plate. The bags are supported in upright positions by wire frame structures (not shown) and are suitably sealed in communication with associated plate openings.

As seen in FIG. 2, the openings in plate 16, are distributed in plural, radially spaced rings which are concentric with the plate's central axis shown at 22. The openings in plate 16, in a representative air-filter system, are about four and one-quarter inches in diameter, and the openings in each of the concentric rings is equally spaced angularly from adjacent openings in that ring. Representative openings in the outermost three rings of openings in the plate are indicated at 24, 26 and 28 in FIGS. 2 and 3.

Still with reference to FIGS. 1 and 2, a vacuum device 30 in system 10 includes a pair of diametrally opposed hollow vacuum sweep arms 32, 34, mounted for rotation about axis 22. The two arms communicate through a conventional rotary seal with a conduit 36, which is connected, at its right end in FIG. 1, with a conventional vacuum source (not shown). Conduit 36 forms part of what is referred to herebelow as vacuum means. A motor 38, acting through a chain 40 (FIG. 1), is used in rotating arms 32, 34 at a desired constant speed in the direction of arrow 41 in FIGS. 1, 2, and 3.

Apparatus 12, and an identical vacuum sweep apparatus 42 (FIG. 2) are mounted on the ends of arms 32, 34, respectively, for rotation therewith. As can be appreciated from FIG. 2, and as will be described further below, apparatus 12 is adapted to communicate openings, such as openings 24, 26, 28 in the outermost three rings of openings in plate 16, with the interior of arm 32, to apply a vacuum to the associated air-filter bags. Similarly, apparatus 42 is adapted to communicate the air-filter bags covering openings in the innermost three rings of openings in the plate with the interior of arm 34. The present invention in sweep apparatus will be described below with reference to apparatus 12.

With reference now particularly to FIGS. 4–7, inclusive, a base conduit, or base conduit section, 44 in apparatus 12 is joined as by welding to a flange 46, which is bolted to a confronting flange carried at the outer end of arm 32 to mount apparatus 12 on arm 32. The hollow interior of section 44 communicates with the interior of arm 32 through a port 48 (FIG. 7) in section 44. Formed in the upper wall of section 44 is a somewhat elongate upper port 50 which is bordered peripherally by an outwardly extending flange, or rim, 52. Arm 32 and section 44 mounted thereon are also referred to herebelow collectively as a vacuum arm assembly.

Figure 6:
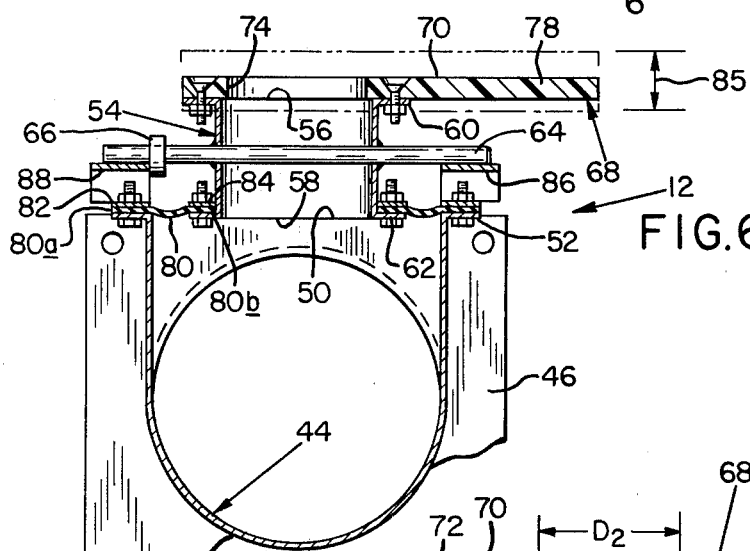
FIG. 6 is a sectional view, rotated 90° clockwise, taken along line 6—6 in FIG. 5, showing in dash-double-dot and dash-dot lines, respectively, upper and lower extremes in the allowed positions of a contact face in the apparatus.
Figure 7:
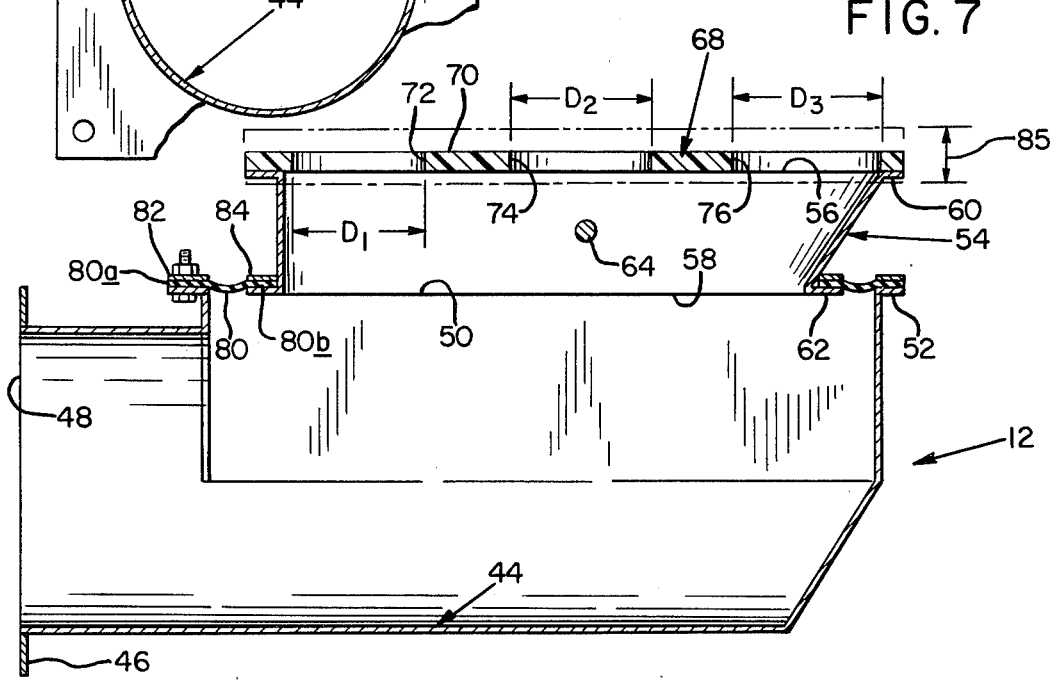
FIG. 7 is a sectional view taken along line 7—7 in FIG. 5, with the extremes in allowed vertical movement of the contact face depicted as in FIG. 6.

An oblong head conduit, or head conduit section, 54 has a hollow interior which terminates at an upper port, or mouth, 56 and at a lower port, or throat, 58 (FIGS. 6 and 7). Mouth 56 is bordered by a planar flange, or rim, 60 (FIGS. 5, 6, and 7) and throat 58, by a planar flange, or rim, 62 (FIGS. 6 and 7). A shaft 64 is mounted on and extends through opposed side walls in section 54 as shown, with the left end region of the shaft in FIG. 6 having a nut 66 secured thereto. Section 54 is also referred to herein as a vacuum head.

A plate-contact member 68 is bolted securely to rim 60 in section 54 as shown. The upper planar surface of member 68 forms a contact face 70 which is in contact with the lower surface of plate 16 during operation of the vacuum device. Member 68, and particularly the contact face therein, is preferably formed of a high molecular weight polymer having a lubricative surface property which reduces contact friction as apparatus 12 is moved with respect to the plate.

Aperture means formed in member 68 includes three circular, radially spaced apertures 72, 74, 76 communicating contact face 70 with the interior of section 54. It can be appreciated in FIGS. 2 and 3 that these apertures are adapted, with section 54 mounted on section 44 in a manner to be described, for successive registries with openings in the three outermost rings of openings in plate 16.

The diameters of openings 72, 74, 76, which diameters are indicated at $D_1$, $D_2$, $D_3$, respectively, in FIG. 7, increase slightly progressing radially outwardly. Specifically, where, as here, the diameter of the plate openings is four and one-quarter inches, as noted above, $D_1$, $D_2$, and $D_3$ have values of three and five-eighths inches, three and three-quarters inches, and four inches, respectively. FIG. 3 shows, in exaggerated scale, the relative sizes of equal-diameter openings 24, 26, 28 and associated apertures 72, 74, 76, respectively, with the apertures shown in positions of simultaneous coaxial registry with the openings. In actuality, the three apertures in apparatus 12 are not necessarily simultaneously in position of coaxial registry with three radially spaced openings in plate 16, as suggested in FIG. 3. The different diameters of the three apertures are such as to produce a substantially equal air-flow rate through each of the openings when the associated apertures are in registry with the openings.

Defined between the just-described apertures and the leading edge of member 68 (the upper edge in FIG. 5) is a planar apron, or apron portion, 78. This portion has a width somewhat greater than the diameter of the openings in plate 16, so that as apparatus 12 moves toward an opening in the plate, that opening is completely covered by the apron before any overlap between the opening and the associated aperture in member 68 occurs (as seen in FIG. 3).

Section 54 is joined in fluid communication with section 44 by a flexible, fluid-tight skirt 80. An outer peripheral edge portion 80a of the skirt is sandwiched between rim 52 in section 44 and a rim clamp 82 which is bolted to this rim. Similarly, an inner peripheral edge portion 80b of the skirt is sandwiched between rim 62 in section 54 and a rim clamp 84 secured by bolting to rim 62. The flexible central portion of the skirt between its outer and inner sandwiched edge portions allows limited, multi-directional movement of section 54 with respect to section 44, as indicated by the double-ended arrows in FIG. 4. The extent of allowed travel of the contact face formed on member 68 in upper and lower directions is indicated by dash-double-dot and dash lines, respectively, in FIGS. 6 and 7, with face 70 being shown in solid lines in an intermediate position. The total vertical travel allowed, indirected by arrow 85 in FIGS. 6 and 7, is about two inches.

Section 54 and member 68 carried thereon are biased toward the lower surface of plate 16 by a pair of springs 86, 88 which are fastened at their base portion, to rim 52 in section 44 as shown. The free ends of the springs are fashioned to cradle the associated end regions of shaft 64, as can be appreciated in FIGS. 4, 5, and 6. Referring to FIGS. 5 and 6, spring 88 is positioned to engage nut 66, to maintain sections 54, 44 at positions of relative axial alignment as apparatus 12 is moved with respect to plate 16. Springs 86, 88, are also referred to herein as biasing means, and this biasing means and skirt 80 are referred to collectively as articulation means.

In operation, head 54 has an average position, with respect to section 44, substantially as shown in FIGS. 6 and 7—that is, with plate member 68 positioned about midway between its extreme allowed vertical positions. Member 68 is biased against the lower surface of the plate by springs 86, 88, with multidirectional tilting of the contact member accommodated by skirt 80 effecting maximal contact between contact face 70 and the lower surface of plate 16 at every position of arm 32. Thus as each aperture in member 68 moves to a position of registry with an associated opening in plate 16, the passage formed between the aperture and the opening is well sealed.

According to another feature of the present invention, as apparatus 12 is moved toward an opening, the apron portion in the contact member completely covers that opening, blocking further introduction of unfiltered air through that opening into the associated filter bag just prior to application of vacuum to the bag. As the associated aperture then moves into a position of registry with that opening, the bag is subject to abrupt evacuation, with such acting to dislodge accummulated particles on the inner sides of the bag efficiently. This contrasts with the prior art, where initial overlap between an aperture in a sweep apparatus and plate opening occurs before the opening is completely closed to the flow of pressurized unfiltered air. There, the pressurized air flow prevents abrupt evacuation of the filter bag, and also tends to "reduce" the vacuum applied by the vacuum device to in-register filter bags.

Finally, it is noted that by providing relatively larger apertures, and hence relatively larger in-registry air-flow passages, at positions in the apparatus which are radially more removed from the source of vacuum, the air-flow rate into each of the three apertures, when the same is in registry with an opening in plate 16, is substantially identical.

While a preferred embodiment of the present invention has been described herein, it is apparent that various changes and modifications can be made without departing from the spirit of the invention.

It is claimed and desired to secure as Letters Patent:

1. Sweep apparatus in a system which includes a plate having an array of openings therein, a plurality of filter bags mounted on one side of said plate and communicating with said openings, and a vacuum sweep arm disposed on the other side of the plate and mounted for recurrent movement with respect thereto, said apparatus comprising
    a base conduit section mounted on said arm for movement therewith as a unit, said base section including a pair of ports, with one port in direct fluid communication with the interior of said arm,
    a head conduit section having a mouth and a throat,
    a flexible, fluid-tight skirt joining the other port in said base section in sealed fluid communication with said throat in said head section, said skirt accommodating limited multi-directional movement of said head section with respect to said base section,
    a plate-contact member carried on said head section and extending over the mouth therein, said member having a contact face including an aperture therein which opens to said mouth and which is adapted for successive registries with different openings in said plate, with the contact face disposed adjacent the plate's said other side, and
    biasing means interposed between said base section and said head section for biasing said contact member's contact face toward said other side of said plate.

2. The apparatus of claim 1, wherein said contact face is substantially planar, and includes an apron portion adjacent said aperture, which portion, with such recurrent movement of said arm, and prior to each successive registry between said aperture and an opening in said plate, completely covers such opening.

3. Sweep apparatus in an air-filter system which includes a horizontally disposed substantially planar plate having an array of openings therein, a plurality of filter bags mounted on the upper side of said plate and communicating with said openings, and a vacuum sweep arm mounted below said plate for rotation in a plane substantially parallel thereto, said apparatus comprising
    a base conduit section mounted on said arm for rotation therewith as a unit, said base section including a pair of ports, with one port in direct fluid communication with the interior of said arm,
    a head conduit section having a mouth and a throat,
    a flexible, fluid-tight skirt joining the other port in said base section in sealed fluid communication with said throat in said head section, said skirt accommodating limited multi-directional movement of said head section with respect to said base section,
    a plate contact member carried on said head section and extending over the mouth therein, said member having a contact face including aperture means therein which opens to said mouth and which is adapted for successive registries with different openings in said plate, with the contact face disposed adjacent the plate's lower side, and
    biasing means interposed between said base section and said head section for biasing said contact member's contact face toward the lower side of said plate.

4. The apparatus of claim 3, wherein said contact face is substantially planar, and includes an apron portion adjacent said aperture means, which portion, with such rotation of said arm, and prior to each successive registry between said aperture means and an opening in said plate, completely covers such opening.

5. The apparatus of claim 3, wherein the openings in said plate are of substantially uniform cross-sectional area, and are distributed in plural, radially spaced rings concentric with the axis of rotation of the arm, said aperture means includes an aperture associated with each ring radially spaced with respect to said axis of rotation and positioned for registry with the openings in the associated ring, and adjacent apertures have progressively larger cross-sectional areas progressing radially outwardly from said axis.

6. The apparatus of claim 5, wherein the cross-sectional size differences between radially adjacent apertures are selected to produce, for each registry between an aperture and an opening, substantially like air-flow characteristics.

7. An air-filter system including a plate having an array of openings, and a plurality of filter bags mounted on one side of said plate and communicating with said openings, wherein the improvement comprises,
    a vacuum arm assembly mounted for recurrent movement over the other side of said plate, said assembly having an air-flow conduit terminating at one end in a port,
    a vacuum head adapted for successive fluid-communicative registries with different ones of said openings, with such recurrent movement of said arm assembly, said vacuum head including a conduit head section having a mouth and throat, and
    articulation means operatively coupling said head and said arm assembly enabling multidirectional articulation of the head relative to the assembly to accommodate pressure-biased sealed registry between said head and said openings with the arm and said plate in different relative positions, said articulation means including a flexible, fluid-tight skirt joining said port in said assembly in sealed fluid communication with said throat in said head section, said skirt accommodating limited multidirectional movement of said head section with respect to said assembly, and biasing means interposed between said assembly and said head section for biasing said head sections toward said other side of said plate.

* * * * *